United States Patent [19]

Brueggemann

[11] Patent Number: 5,253,917
[45] Date of Patent: Oct. 19, 1993

[54] APPARATUS FOR FASTENING A REMOVABLE ROOF SECTION OF A PASSENGER CAR

[75] Inventor: Heinrich Brueggemann, Hagen, Fed. Rep. of Germany

[73] Assignee: Wilhelm Karmann GmbH, Osnabrueck, Fed. Rep. of Germany

[21] Appl. No.: 874,495

[22] Filed: Apr. 27, 1992

[30] Foreign Application Priority Data

May 6, 1991 [DE] Fed. Rep. of Germany ... 9105583[U]

[51] Int. Cl.$^5$ .................................................. B60J 7/185
[52] U.S. Cl. ................................. 296/218; 296/224; 296/146.1; 292/336.3; 292/DIG. 5; 74/109; 74/547; 49/465
[58] Field of Search ........... 296/216, 218, 224, 146 R; 292/336.3, DIG. 5, DIG. 63; 74/109, 547; 49/465

[56] References Cited

U.S. PATENT DOCUMENTS

| | | | |
|---|---|---|---|
| 3,372,954 | 3/1968 | Castelgt | 296/224 |
| 3,949,625 | 4/1976 | Bienert | 292/DIG. 5 X |
| 4,616,864 | 10/1986 | Douglas | 292/336.3 |
| 4,786,092 | 11/1988 | Shiraishi et al. | 296/224 X |

FOREIGN PATENT DOCUMENTS

| | | | |
|---|---|---|---|
| 1157494 | 11/1963 | Fed. Rep. of Germany | 296/224 |
| 2125304 | 11/1972 | Fed. Rep. of Germany | 292/336.3 |
| 1582667 | 1/1981 | United Kingdom | 292/336.3 |

Primary Examiner—Dennis H. Pedder
Attorney, Agent, or Firm—Jordan and Hamburg

[57] ABSTRACT

Fastening apparatus for detachably fastening a removable roof section to a vehicle body includes an elongated locking device on the roof section movable between a roof-lock position in which the locking device locks the roof section to the vehicle body and a roof-unlock position in which the locking device unlocks the roof section from the vehicle body. A bow-shaped handle has two end parts, and a rotatable device rotatably connects one end part of the handle with the locking device such that the handle is rotatable between a handle-lock position to dispose the locking device in the roof-lock position and a handle-unlock position to dispose the locking device in the roof-unlock position. A connecting device is disposed between the other end part of the handle and the connecting link, the disconnectable connecting device having a connect position which connects the other end part of the handle and a rotatable connecting link. The disconnectable connecting device has a disconnect position which disconnects the other end part of the handle from the connecting link such that the other end part of the handle is separated from the roof section to thereby enable the one end part of the handle to be rotated by the rotatable device between the handle-lock position and the handle-unlock position.

21 Claims, 5 Drawing Sheets

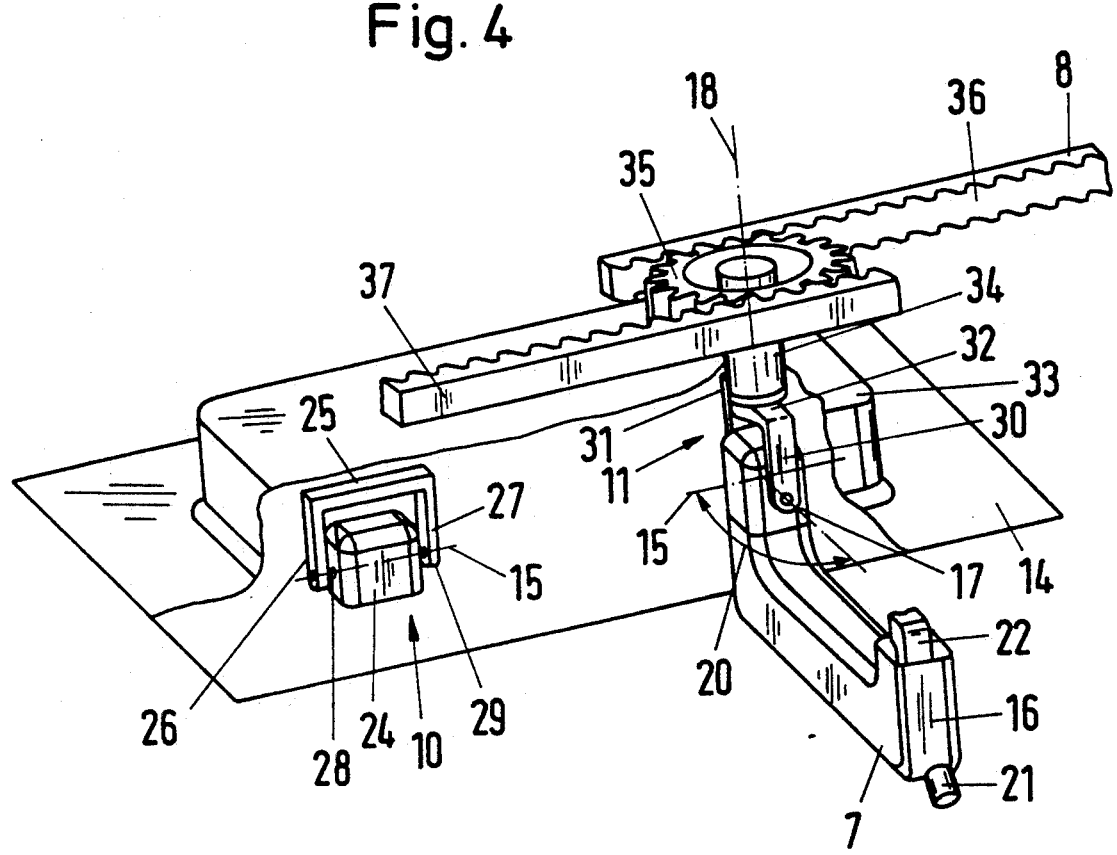

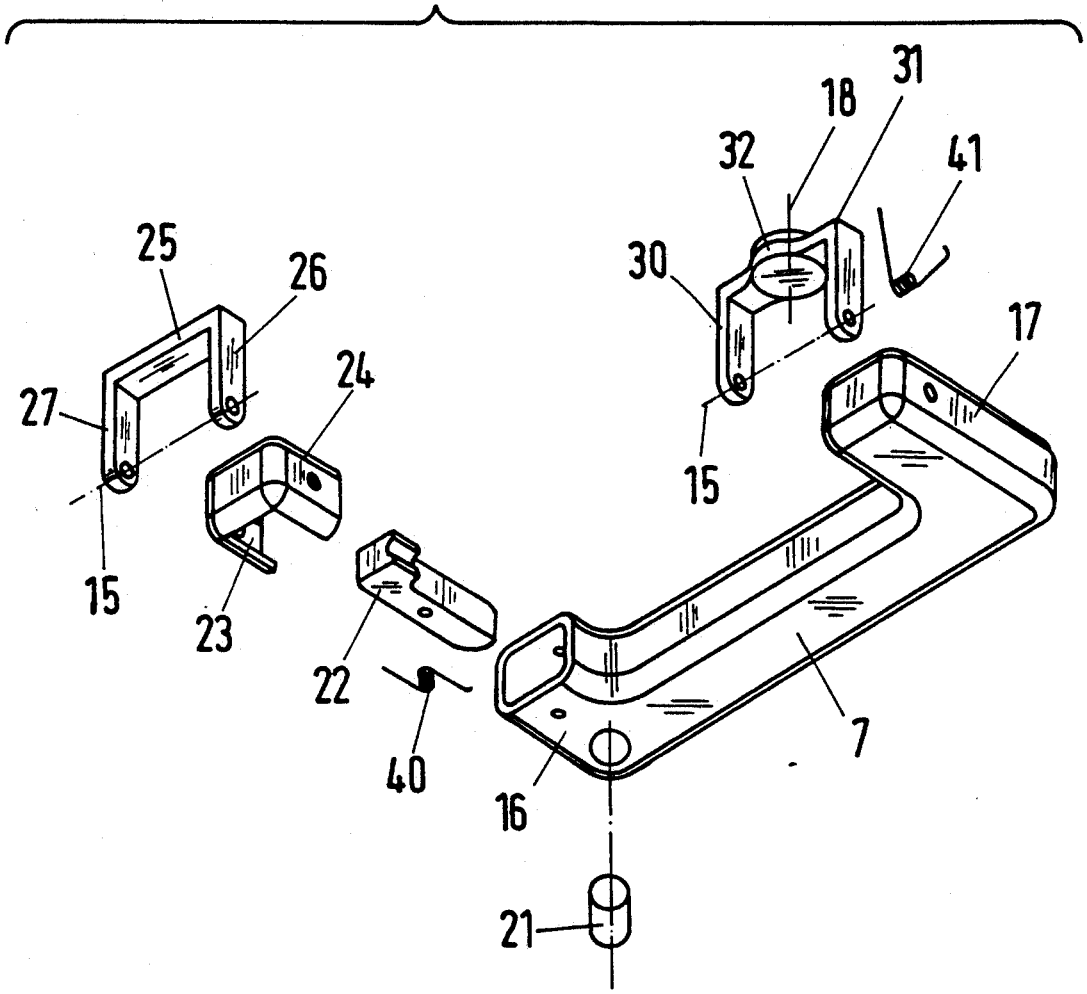

APPARATUS FOR FASTENING A REMOVABLE ROOF SECTION OF A PASSENGER CAR

This invention relates to an apparatus for fastening a removable roof section of a passenger car.

BACKGROUND OF THE INVENTION

Such apparatuses for fastening removable roof sections of passenger cars have a locking and unlocking mechanism in the form that plug-in and locking elements, which can be connected with the vehicle body, are constructed at the roof part. These plug-in and locking elements position the removable roof section in its closed position with a plug-in connection in the installed position in the roof region and then secure it with a locking hook that can be moved with a lever. These plug-in and locking elements, with their associated operating levers, adversely affect the head room in the interior of the vehicle and are inadequately protected against inadvertent opening.

SUMMARY OF THE INVENTION

It is therefore an object of the invention to provide an apparatus for fastening a removable roof section of a passenger car, the operating organs of which apparatus, when the roof section is in the locked position, can be used as a passenger handle and which are, at the same time, reliably secured against inadvertent unlocking.

The invention provides a fastening apparatus, the locking mounting of which, which is formed by the locking rod and the operating handle connected with this locking rod on the driving side, is integrated in such a manner in the interior lining of the roof section, that the operating handle, which is held movably by the swiveling joint and the connecting piece, is embedded sufficiently far below the inner plane of the roof after the locking rod is locked into place in the car body roof by an appropriate swiveling operation, that the head room is not adversely affected. After this operating handle, which is constructed as a bow-shaped handle, is swung out from its locking position below the interior plane of the roof, it can be used by passengers as a holding handle. During such use, the operating handle cannot be detached from the connecting piece, since a release knob, which would have to be actuated for this purpose, is disposed ergonomically in such a manner at the handle, that it is accessible only when the vehicle door is open. With that, the safety of a reliable closure in the locking position is assured.

Reference is made to the following description and to the drawing with regard to further advantages and details. An embodiment of the object of the invention is shown diagrammatically, in greater detail in the drawings.

BRIEF DESCRIPTION OF THE DRAWINGS

FIG. 4 shows a representation of the operating handle of FIGS. 2 and 3 with its connection to a locking rod in the unlocked position; and FIG. 5 shows an exploded representation of the operating handle.

DESCRIPTION OF THE PREFERRED EMBODIMENTS

Figure 1:
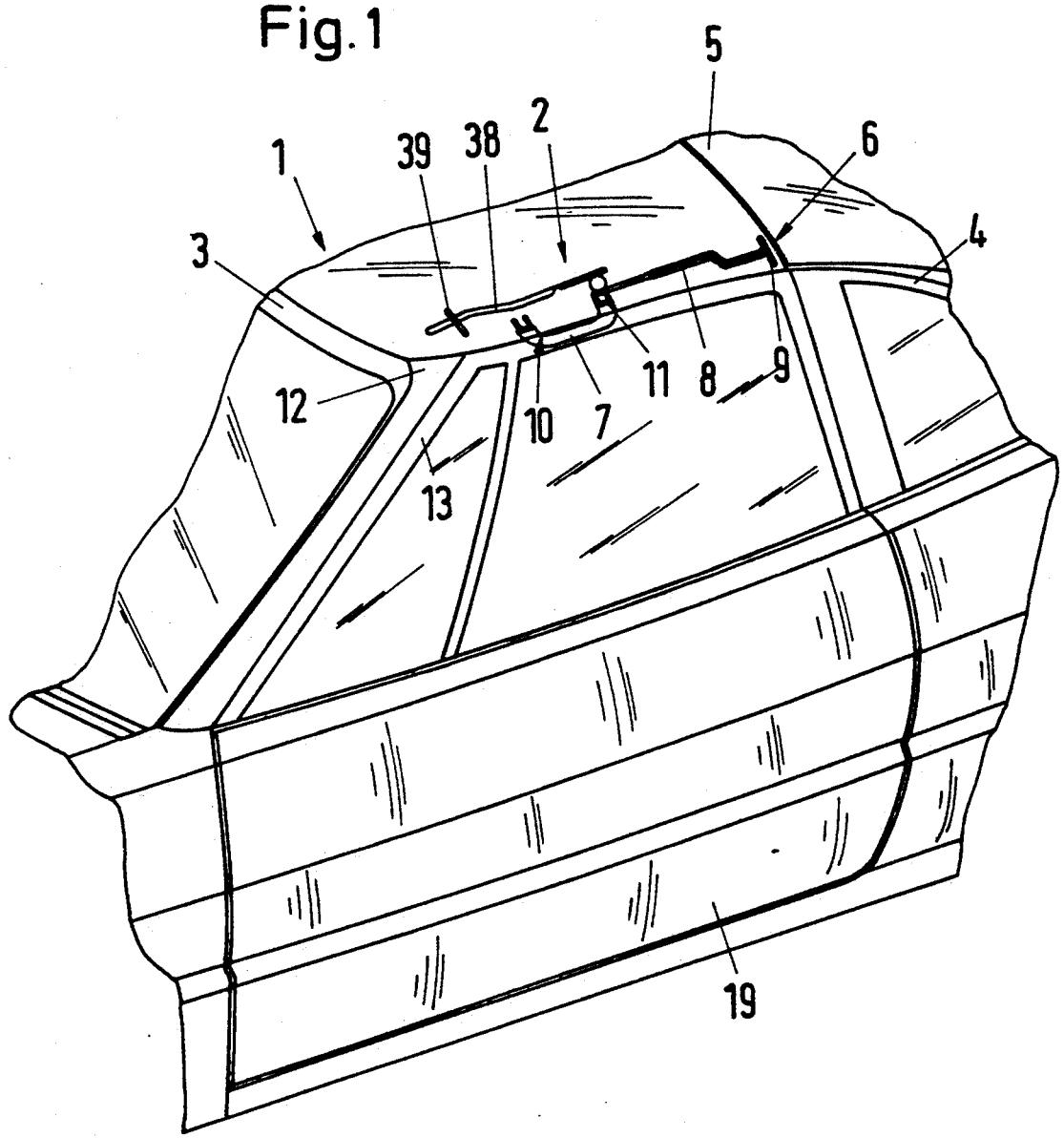
FIG. 1 shows a perspective partial section of the front side region of a passenger car with the arrangement in principle of an inventive apparatus for fastening a removable roof section.

In FIG. 1, a removable roof section, which is labeled 1 as a whole, is shown together with the associated fastening apparatus 2 in a basic arrangement. The roof section 1 between the front region 3 and the rear region 4 of a fixed car-body roof 5 is held by means of a locking mounting 6. The fastening apparatus 2 has an operating handle 7, which is constructed as a bow-shaped handle, and a movable locking rod 8, which supports the locking apparatus 2 and the roof section 1 as a whole at the car-body roof 5 in a form recess 9.

The operating handle 7 is held by a connecting piece 10 at the roof section 1 so that it can be swivelled and by a swivel joint 11 so that it can be rotated. The fastening apparatus 2, with its locking mounting, is on both sides (not shown) of the roof section 1 and is at such a distance from the side 12 of the car body and from the door frame 13, that the operating handle 7 is conveniently accessible in a holding position, for example, when the vehicle is moving, and when passengers are entering or leaving the vehicle, or in an unlocked position when the roof section 1 is being taken off.

Figure 2:
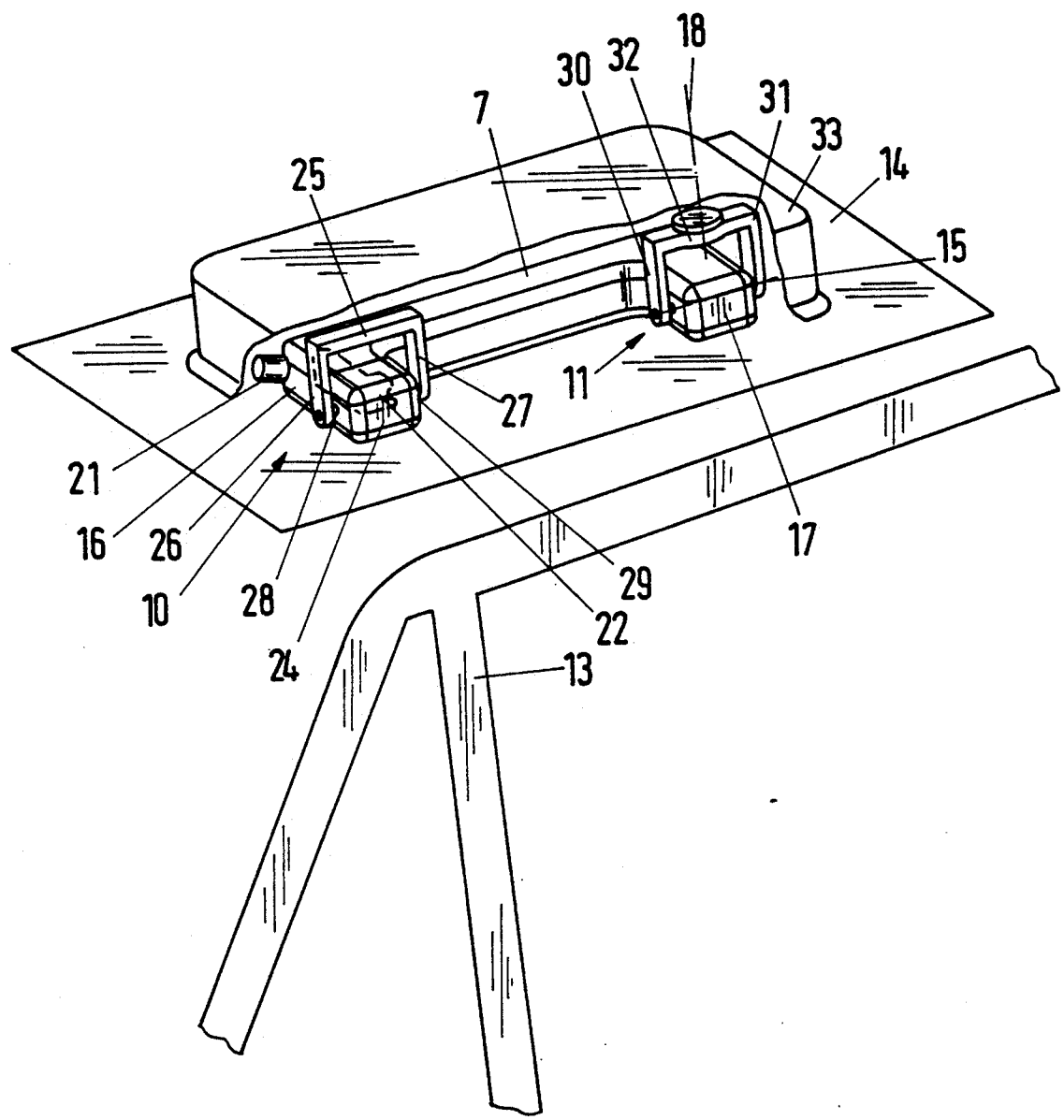
FIG. 2 shows a basic representation of the position of an operating handle of the fastening apparatus in the roof section, on an enlarged scale.
Figure 3:
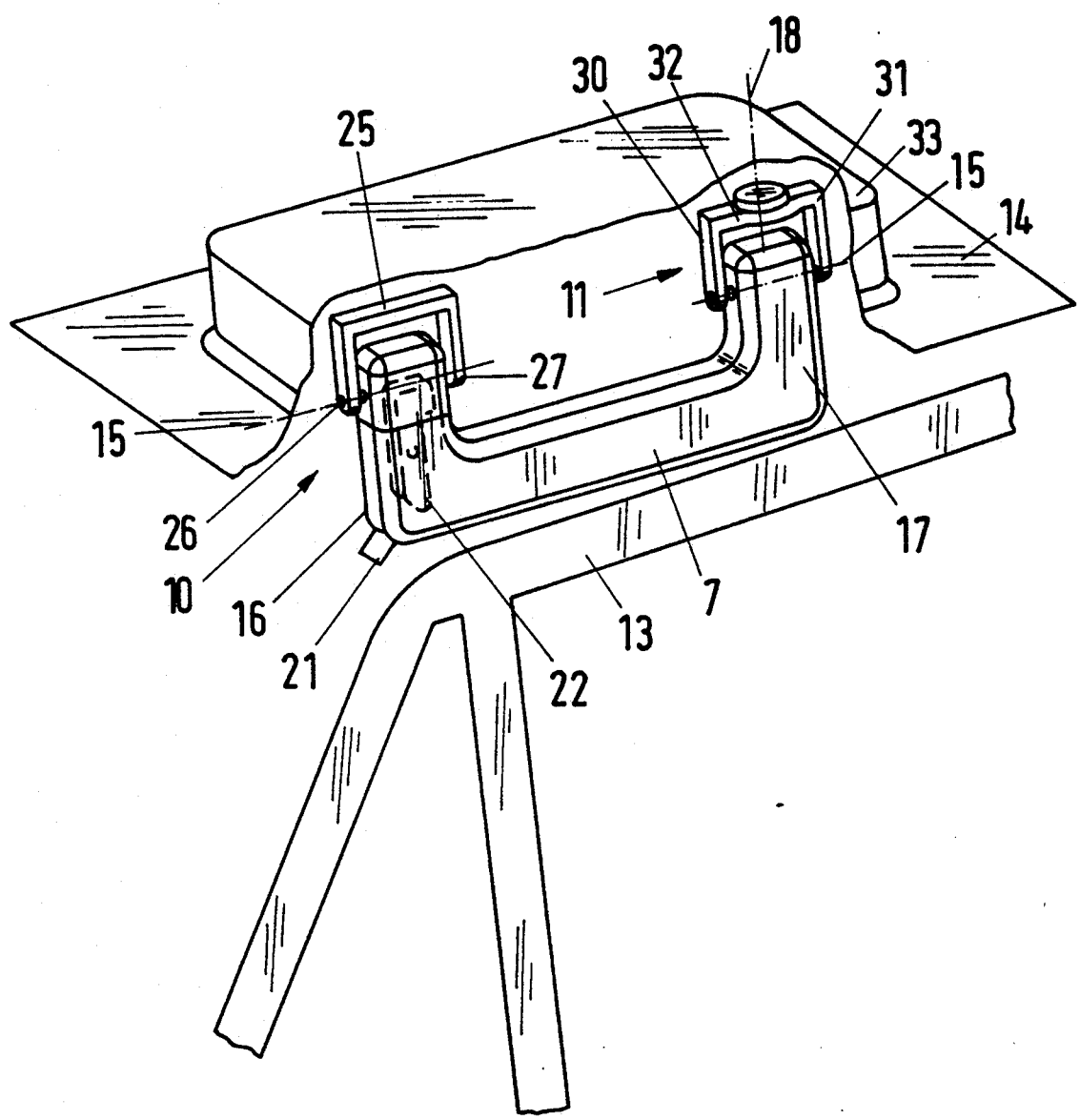
FIG. 3 shows a representation of the operating handle of FIG. in the holding position.

FIG. 2 shows an enlarged, individual representation of the operating handle 7 in a locking position, countersunk in the roof section 1 (FIG. 1) below an internal plane 14 of the roof. The operating handle 7 can be swivelled form this locking position about a holding axis 15, which is parallel to the longitudinal axis (not shown) of the vehicle into a holding position (FIG. 3). During this time, the front end 16 of the operating handle remains fixed in the connecting piece 10 that is held at the roof section 1 and a rear end 17 is held in the rotatable swivel joint 11.

In FIG. 4, the operating handle 7 is shown rotatable about a main axis 18 that is perpendicular to an internal plane 14 of the roof. For this purpose, a vehicle door 19 (FIG. 1) or the associated door frame 13 is also swivelled until the operating handle 7 in the swivel joint part 11 can be rotated about an angle of rotation 20 without coming up against an impeding stop through, for example, 90° into the unlocked position.

In the embodiment of FIGS. 2 to 4, the operating handle 7 has, in the region of the front end 16 that can be detached from the connecting piece 10, a release knob 21, which engages the connecting piece 10, which is held at the roof section 1, with a locking hook 22. This release knob 21 advisably is disposed with inclination in the front end 16 of the operating handle 7, so that the accessibility in the locking position (FIG. 2) a well as in the holding position (FIG. 3) is at least limited, in order to avoid inadvertent unlocking.

In the holding position, the release knob 21 is aligned essentially towards the front region 3 of the vehicle and, with that, is also not accessible from the rear of the vehicle, for example, to children playing, to the thumb of a hand placed in the operating handle 7 that is constructed as a bow-shaped handle.

The locking hook 22, which can be actuated with the release knob 21, is connected with the connecting piece 10 that is formed by a connecting link 24 with a form recess 23 and a holding frame 25 (FIG. 5); by means of the arrangement of the release knob 21 described above, the locking hook 22 can be unlocked only when the vehicle door 19 is open and by a person standing next to the vehicle. A reliable safeguard against inadvertent unlocking is thus provided.

In an appropriate construction, the holding frame 25 has two holding legs 26, 27, which, by means of pins 28, 29 (FIG. 2), support the connecting link 24 so that it can swivel in the holding axis 15.

The operating handle 7, which is separated from the connecting piece 10 in FIG. 4 and rotated about the main axis 18 by the angle of rotation 20, is supported in the region of the rear end 17 in the swivel joint 11 between two legs 30, 31 of a holding fork 32 by means of axial pins (which are not shown). This holding fork 32 is connected with a central pivot 34 in the region of a part 33 of the roof, which part 33 is disposed in an upward direction. The central pivot 34 has an operable connection to the locking rod 8.

In an appropriate construction, a pinion gear 35 is disposed at the end of the central pivot 34. This pinion gear 35 is interlocked with the locking rod 8, which is constructed at least in regions as a guiding toothed rack 36. The movement of the operating handle 7 about the angle of rotation 20 brings about a rotation of the pinion gear 35 about the main axis 18 and, tangentially to this, a shift of the locking rod 8 in the direction of the longitudinal axis of the vehicle in such a manner, that the end of the locking rod 8 in the region of the form recess 9 assumes as locking mounting 6 with respect to the car body roof 5 a locking position or an unlocking position, depending on the direction of rotation, for the removable roof section 1.

In a further embodiment, a guiding toothed rack 37, which is parallel to the guiding toothed rack 36, can be supported as an abutment movably at the roof section 1 and have in the front region a locking extension 38 that is accommodated in a mounting 39 (FIG. 1).

The guiding toothed racks 36, 37 can be constructed therewith advantageously as locking elements, which can move synchronously with the pinion gear 35 in opposite directions, the ends of which locking elements, which are constructed as locking rods, engage in each case the rear form recess 9 in the rear region 4 or a front form recess (no shown) in the front region 3 in the fixed car body roof 5.

The representation of FIG. 4 illustrates the position of the operating handle 7 for unlocking the guiding toothed racks 36, 37 when taking out or re-inserting the roof section 1. As the operating handle 7 is swivelled back in the direction of the connecting piece 10, the parallel shifting of the guiding toothed racks 36, 37 takes place and, with that, optionally the locking of the roof section 1. For this purpose, the locking hook 22 engages the coupling link 24 and the operating handle 7 is forced into the locking position of FIG. 2 by means of restoring springs 40, 41 (FIG. 5) in the area of the release knob 21 and the holding fork 32.

The object of the invention is not limited to the embodiment shown in the drawing and described above, since a modification of the roof section 1, for example, in the form of removable roof halves as a so-called Targa roof, is also conceivable, as are otherwise shaped designs of the operating handle 7 for achieving a pleasing inner appearance of the vehicle.

What I claim is:

1. Fastening apparatus for detachably fastening a removable roof section to a vehicle body comprising an elongated locking mean on said roof section movable between a roof-lock position in which said locking means locks said roof section to said vehicle body and a roof-unlock position in which said locking means unlocks said roof section from said vehicle body, a bow-shaped handle having two end parts, rotatable means rotatable connecting one end part of said handle with said locking means such that said handle is rotatable between a handle-lock position to dispose said locking means in said roof-lock position and a handle-unlock position to dispose said locking mean in said roof-unlock position, a connecting link rotatably joined to the roof section and forming an extension of the other of said end parts of said handle, and disconnectable connecting means between said other end part of said handle and said connecting link, said disconnectable connecting means having a connect position which connects said other end part of said handle and said connecting link, said disconnectable connecting means having a disconnect position which disconnects said other end part of said handle from said connecting link such that said other end part of said handle is separated from said connecting link to thereby enable said one end part of said handle to be rotated by said rotatable means between said handle-lock position and said handle-unlock position.

2. Fastening apparatus according to claim 1, wherein said rotatable means further comprises first swivel means for rotatably supporting said one end part of said handle for swiveling movement about a swiveling axis which is perpendicular to said rotatable axis, said disconnectable connecting means further comprising second swivel means for swivelably supporting said other end part of said handle on said connecting link for swivel movement about said swivel axis.

3. Fastening apparatus according to claim 2, wherein said vehicle body has a longitudinal axis extending generally in the direction of movement of the vehicle body over a ground surface, said swivel axis being generally parallel to said longitudinal axis.

4. Fastening apparatus according to claim 2, wherein said handle comprises a generally U-shaped member having two spaced legs extending from a connecting base, each of said legs having an end, said first and second end parts of said handle being disposed at said leg ends.

5. Fastening apparatus according to claim 4, wherein each of said legs and said connecting base has a generally central axis disposed in a common handle plane, said roof section having a roof plane defining a section of the interior of the roof of said vehicle body, said handle being swivelable about said first and second swivel means between a retracted position and a non-retracted position, said handle plane being generally parallel to said roof plane when said handle is in said retracted position, said handle plane being generally perpendicular to said roof plane when said handle is in said non-retracted position.

6. Fastening apparatus according to claim 5, wherein said roof section has a counter-sunk section extending inwardly of said roof plane, said handle being disposed within said counter-sunk section when said handle is in said retracted position.

7. Fastening apparatus according to claim 5, wherein said rotatable axis is generally perpendicular to said roof lane.

8. Fastening apparatus according to claim 1, wherein said vehicle body has a longitudinal axis extending generally in the direction of movement of the vehicle body over a ground surface, said rotatable means and said disconnectable connecting means each having swivel means for swivelably supporting said handle for swiveling movement about a swivel axis parallel to said longitudinal axis.

9. Fastening apparatus according to claim 1, wherein said rotatable means rotatably supports said one end part of said handle for rotation about a rotatable axis, said disconnectable connecting means further comprises swivel means swivelably mounting said other end part of said handle for swiveling movement relative to said connecting link about a swivel axis when said disconnectable connection means is in said connect position, said swiveling axis being perpendicular to said rotatable axis.

10. Fastening apparatus according to claim 2, wherein said second swivel means comprises a U-shaped fork part mounted on said said roof section, said U-shaped fork part having two spaced legs, said connecting link being swivelably supported between said spaced legs for swiveling movement about said swivel axis.

11. Fastening apparatus according to claim 1, wherein said rotatable means further comprises swivel means swivelably mounting said one end part of said handle for swiveling movement about a swivel axis which is perpendicular to said rotatable axis.

12. Fastening apparatus according to claim 1, wherein said disconnectable connecting means comprises a release knob on said handle, said release knob having a release position operable to release said other end part of said handle from said connecting link, said release knob having a non-release position operable to preclude release of said other end part of said handle from said connecting link, said knob being movable operable by the operator of the vehicle from said non-release to said release position.

13. Fastening apparatus according o claim 12 further comprising spring mean biasing said release knob toward said non-release position.

14. Fastening apparatus according to claim 12, wherein said vehicle body has a front and a rear with said front being disposed ahead of said rear considered in the direction of movement of said vehicle body over a ground surface, said handle having a forward end portion and a rear end portion, said knob being disposed at said front end portion of said handle.

15. Fastening apparatus for fastening a removable roof section to a vehicle body comprising an elongated locking means on said roof section movable between a roof-lock position in which said locking means locks said roof section to said vehicle body and a roof-unlock position in which said locking means unlocks said roof section from said vehicle body, a bow-shaped handle having two ends parts, rotatable means rotatably connecting one end part of said handle with said locking means such that said handle is rotatable between a handle-lock position to dispose said locking means in said roof-lock position and a handle-unlock position to dispose said locking means in said roof-unlock position, said vehicle body having a door means having shut position and an open postion, said handle being located on said roof section such that said door means precludes rotation of said handle into said handle-unlock position when said door means is in said shut position, said handle being rotatable into said handle-unlock position when said door means is in said open position, a connecting link joined to the roof section and forming an extension of the other of said end parts of said handle, and connecting means detachably connecting said other end part of said handle to said connecting link on said roof section such that said other end part of said handle is detachable from said connecting link on said roof section to enable said handle to be rotated between said handle-lock position and said handle-unlock position.

16. Fastening apparatus for detachably fastening a removable roof section to a vehicle body comprising an elongated locking means on said roof section movable between a roof-lock position in which said locking means locks said roof section to said vehicle body and a roof-unlock position in which said locking means unlocks said roof section from said vehicle body, a bow-shaped handle having two ends parts, rotatable means rotatably connecting one end part of said handle with said locking means such that said handle is rotatable between a handle-lock position to disposed said locking means in said roof-lock position and a handle-unlock position to dispose said locking means in said roof-unlock position, said rotatable means rotatably supporting said one end part of said handle or rotation about a rotatable axis, said rotatable means further comprising swivel means swivelably mounting said one end part of id handle for swiveling movement about a swivel axis which is perpendicular to said rotatable axis, said swivel means comprising a U-shaped fork part rotatably mounted on said roof section for rotation about said rotatable axis, said one end part of said handle being swivelably supported between spaced legs of said U-shaped fork part for swiveling movement bout said swivel axis, a connecting link joined to the roof section and forming an extension of the other of said end parts of said handle, and detachable connecting means detachably connecting said other end part of said handle to said connecting link on said roof section such that said other end part of said handle is detachable from said connecting link on said roof section to enable said handle to be rotated between said handle-lock position and said handle-unlock position.

17. Fastening apparatus according to claim 16, wherein said U-shaped fork part has a central rotatable part rotatable about said rotatable axis, and a pinion gear on said central rotatable part.

18. Fastening apparatus according to claim 17, wherein said locking means has rack gear teeth meshing with said pinion gear.

19. Fastening apparatus according to claim 17, wherein said locking means comprises two parallel sets of rack teeth meshing with said pinion gear.

20. Fastening apparatus according to claim 19, wherein said two sets of rack teeth move linearly in opposite linear directions when said pinion gear is rotated in one direction.

21. Fastening apparatus for detachably fastening a removable roof section to a vehicle body comprising an elongated locking means on said roof section movable between a roof-lock position in which said locking means locks said roof section to said vehicle body and a roof-unlock position in which said locking means unlocks said roof section from said vehicle body, a handle having two end parts, rotatable means rotatably connecting one end part of said handle with said locking means, said rotatable means being rotatable about a rotatable axis such that said handle is rotatable about said rotatable axis between a handle-lock position to dispose said locking means in said roof-lock position and a handle-unlock position to dispose said locking means in said roof-unlock position, a connecting link means rotatably joined to the roof section and forming an extension of the other of said end parts of said handle, and disconnectable connecting means between said other end part of said handle and said connecting link means on said roof section, said disconnectable connecting means having a connect position which connects said other end of said handle and said connecting link means on said roof section, said disconnectable connecting means having a disconnect position which disconnects said other end of said handle from said connecting link means on said roof section such that said other end of said handle is separated from said connecting link means on said roof section to thereby enable said other end of said handle to be disconnected and separated from said connecting link means on said roof section and to be rotated about said rotatable axis between said handle-lock position and said handle-unlock position.

* * * * *